(12) United States Patent
Domae et al.

(10) Patent No.: US 9,089,966 B2
(45) Date of Patent: Jul. 28, 2015

(54) WORKPIECE PICK-UP APPARATUS

(75) Inventors: Yukiyasu Domae, Tokyo (JP); Yasuo Kitaaki, Tokyo (JP); Haruhisa Okuda, Tokyo (JP); Kazuhiko Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 210 days.

(21) Appl. No.: 13/878,321

(22) PCT Filed: Jul. 13, 2011

(86) PCT No.: PCT/JP2011/065961
§ 371 (c)(1),
(2), (4) Date: Apr. 8, 2013

(87) PCT Pub. No.: WO2012/066819
PCT Pub. Date: May 24, 2012

(65) Prior Publication Data
US 2013/0211593 A1    Aug. 15, 2013

(30) Foreign Application Priority Data
Nov. 17, 2010  (JP) .................. 2010-257082

(51) Int. Cl.
G05B 15/00    (2006.01)
G05B 19/00    (2006.01)
B25J 9/16     (2006.01)

(52) U.S. Cl.
CPC ..... *B25J 9/1612* (2013.01); *G05B 2219/39543* (2013.01); *G05B 2219/40053* (2013.01)

(58) Field of Classification Search
CPC ...... B25J 9/1671; B25J 9/1687; B25J 9/1697; G05B 19/4069; G05B 2219/32351; G05B 2219/39031; G05B 2219/40003; G05B 2219/40121; G05B 19/40122; G05B 2219/40127; G05B 2219/40131; G05B 2219/40314; G05B 2219/37563; G05B 2219/37572; G05B 2219/40053

USPC ........ 700/245, 250, 251, 253, 254, 255, 258, 700/259; 318/568.11, 568.12, 568.13, 318/568.16, 568.18, 568.19, 568.21, 568.22
See application file for complete search history.

(56) References Cited

U.S. PATENT DOCUMENTS 5,446,835 A * 8/1995 Iida et al. .............. 700/259
6,328,523 B1 * 12/2001 Watanabe et al. ...... 414/416.01
(Continued)

FOREIGN PATENT DOCUMENTS

CN    101100060 A    1/2008
EP    1 385 122 A1   1/2004
(Continued)

OTHER PUBLICATIONS

Rolf Dieter Schraft and Thomas Ledermann, Intelligent picking of chaotically stored objects, 2003, EMERALD INSIGHT, Assembly Automation, vol. 23 o No. 1 o 2003 o pp. 38-42.*

(Continued)

*Primary Examiner* — Dalena Tran
*Assistant Examiner* — Jaime Figueroa
(74) *Attorney, Agent, or Firm* — Oblon, McClelland, Maier & Neustadt, L.L.P.

(57) ABSTRACT

A workpiece pick-up apparatus including: a hand for gripping a workpiece; a robot for bringing the hand into a desired gripping position or posture; a sensor for performing three-dimensional measurement of the workpiece to obtain workpiece measurement data; a storage medium for accumulating at least hand profile data; an information processing unit for calculating the gripping position or posture based on data from the sensor and data from the storage medium; and a control unit for controlling the robot based on the gripping position or posture calculated by the information processing unit. The information processing unit includes an optimum gripping candidate creating section for directly deriving the gripping position or posture based on the workpiece measurement data and the hand profile data.

7 Claims, 17 Drawing Sheets

(56) References Cited

U.S. PATENT DOCUMENTS

| | | | |
|---|---|---|---|
| 7,123,992 B2* | 10/2006 | Ban et al. | 700/258 |
| 7,313,464 B1* | 12/2007 | Perreault et al. | 700/245 |
| 7,996,114 B2* | 8/2011 | Ban et al. | 700/259 |
| 8,098,928 B2* | 1/2012 | Ban et al. | 382/153 |
| 8,559,699 B2* | 10/2013 | Boca | 382/153 |
| 8,606,398 B2* | 12/2013 | Eakins et al. | 700/245 |
| 8,630,737 B2* | 1/2014 | Oda | 700/259 |
| 8,660,685 B2* | 2/2014 | Irie et al. | 700/213 |
| 8,660,697 B2* | 2/2014 | Handa et al. | 700/259 |
| 8,825,212 B2* | 9/2014 | Irie et al. | 700/259 |
| 2005/0075752 A1* | 4/2005 | Ban et al. | 700/213 |
| 2006/0111811 A1 | 5/2006 | Okamoto et al. | |
| 2006/0111812 A1 | 5/2006 | Okamoto et al. | |
| 2006/0112034 A1 | 5/2006 | Okamoto et al. | |
| 2006/0116973 A1 | 6/2006 | Okamoto et al. | |
| 2006/0184279 A1 | 8/2006 | Okamoto et al. | |
| 2007/0274812 A1* | 11/2007 | Ban et al. | 414/217 |
| 2007/0282485 A1* | 12/2007 | Nagatsuka et al. | 700/245 |
| 2008/0009972 A1* | 1/2008 | Nihei et al. | 700/245 |
| 2010/0324737 A1* | 12/2010 | Handa et al. | 700/259 |
| 2011/0122231 A1* | 5/2011 | Fujieda et al. | 348/47 |

FOREIGN PATENT DOCUMENTS

| | | |
|---|---|---|
| JP | 3 270890 | 12/1991 |
| JP | 9 277184 | 10/1997 |
| JP | 11-114860 A | 4/1999 |
| JP | 11 198076 | 7/1999 |
| JP | 11 300670 | 11/1999 |
| JP | 2000 263482 | 9/2000 |
| JP | 2000 304509 | 11/2000 |
| JP | 2007 319997 | 12/2007 |
| JP | 2008-15683 A | 1/2008 |
| JP | 2008 87074 | 4/2008 |
| JP | 2008-272886 A | 11/2008 |
| JP | 2009-248214 | 10/2009 |
| JP | 2010 210511 | 9/2010 |
| JP | 2011-685 A | 1/2011 |
| WO | WO 2004/052596 A1 | 6/2004 |
| WO | 2004 106009 | 12/2004 |

OTHER PUBLICATIONS

Henrik Saldner, PalletPicker-3D: the solution for picking of randomly placed parts, 2003, EMERALD INSIGHT, Assembly Automation, vol. 23 o No. 1 o 2003 o pp. 29-31.*

Combined Chinese Office Action and Search Report issued on Oct. 10, 2014, in Patent Application No. 201180055387.5 with partial English translation and English translation of category of cited documents.

Office Action issued Oct. 15, 2013 in Japanese Patent Application No. 2012-544126 (with English language translation).

International Search Report Issued Sep. 20, 2011 in PCT/JP11/65961 Filed Jul. 13, 2011.

Office Action issued Feb. 27, 2015 in German Patent Application No. 11 2011 103 794.5 (with English translation).

* cited by examiner

CAMERA IMAGE

DISTANCE IMAGE
(BRIGHTER PORTION IS LOCATED CLOSER TO SENSOR)

BULKED WORKPIECES

DISTANCE IMAGE

CAMERA IMAGE

WORKPIECE PICK-UP APPARATUS

TECHNICAL FIELD

The present invention relates to a workpiece pick-up apparatus for picking up a workpiece from among bulked workpieces.

BACKGROUND ART

The workpiece pick-up apparatus is an apparatus for picking up workpieces one by one through use of a robotic hand from an object containing a plurality of bulked workpieces. As a conventional workpiece pick-up apparatus, there is an apparatus disclosed in, for example, Patent Literature 1. This apparatus is configured to assume a representative profile of a workpiece, prestore data on partial profile units, which are obtained by segmenting the workpiece, and priorities corresponding to the respective partial profiles, perform image processing on a plurality of bulkedworkpieces so as to calculate a plurality of partial profiles as candidates for a gripping position, and determine, from among the calculated candidates, a workpiece as an object to be picked up and a gripping portion thereof in consideration of the above-mentioned priorities.

In the above-mentioned method of picking up a workpiece as disclosed in Patent Literature 1, however, the following problems may arise.

As a first problem, under the condition that the number of calculated candidates for a gripping position is small, when the hand is to grip the workpiece determined from among the candidates, there is such a high risk that the hand cannot reach the gripping position due to interference between the hand and the workpieces other than the object to be gripped, or to disturbance of the other workpieces. In order to avoid this problem, it is necessary to calculate a large number of candidates for a gripping position in advance, but in this case, there in turn arises a problem in that the labor, calculation time, and data amount are increased considerably.

As a second problem, the operations of obtaining the partial profiles through segmentation and assigning the priorities to the respective partial profiles need to be defined newly for the profiles of hands different from each other. For this reason as well, there arises a problem in that the labor and calculation time are increased.

CITATION LIST

Patent Literature

[PTL 1] JP 2010-89238 A

SUMMARY OF INVENTION

Technical Problems

The present invention has been made in view of the above-mentioned circumstances, and it is therefore an object thereof to provide a workpiece pick-up apparatus capable of picking up a workpiece while achieving a small amount of data to be held in advance and a short calculation time.

Solution to Problems

In order to achieve the above-mentioned object, according to the present invention, there is provided a workpiece pick-up apparatus, including: a hand for gripping a workpiece; a robot for bringing the hand into a gripping position or posture that is desired; a sensor for performing three-dimensional measurement of the workpiece to obtain workpiece measurement data; a storage medium for accumulating at least hand profile data; an information processing unit for calculating the gripping position or posture based on data from the sensor and data from the storage medium; and a control unit for controlling the robot based on the gripping position or posture calculated by the information processing unit, in which the information processing unit includes an optimum gripping candidate creating section for directly deriving the gripping position or posture based on the workpiece measurement data and the hand profile data.

Advantageous Effects of Invention

According to the workpiece pick-up apparatus of the present invention, through use of the same algorithm even when a workpiece profile has changed, the workpiece can be picked up while achieving a small amount of data to be held in advance and a short calculation time.

DESCRIPTION OF EMBODIMENTS

In the following, a workpiece pick-up apparatus according to embodiments of the present invention is described with reference to the accompanying drawings. Note that, in the figures, the same reference symbols represent the same or corresponding parts.

First Embodiment.

Figure 1:
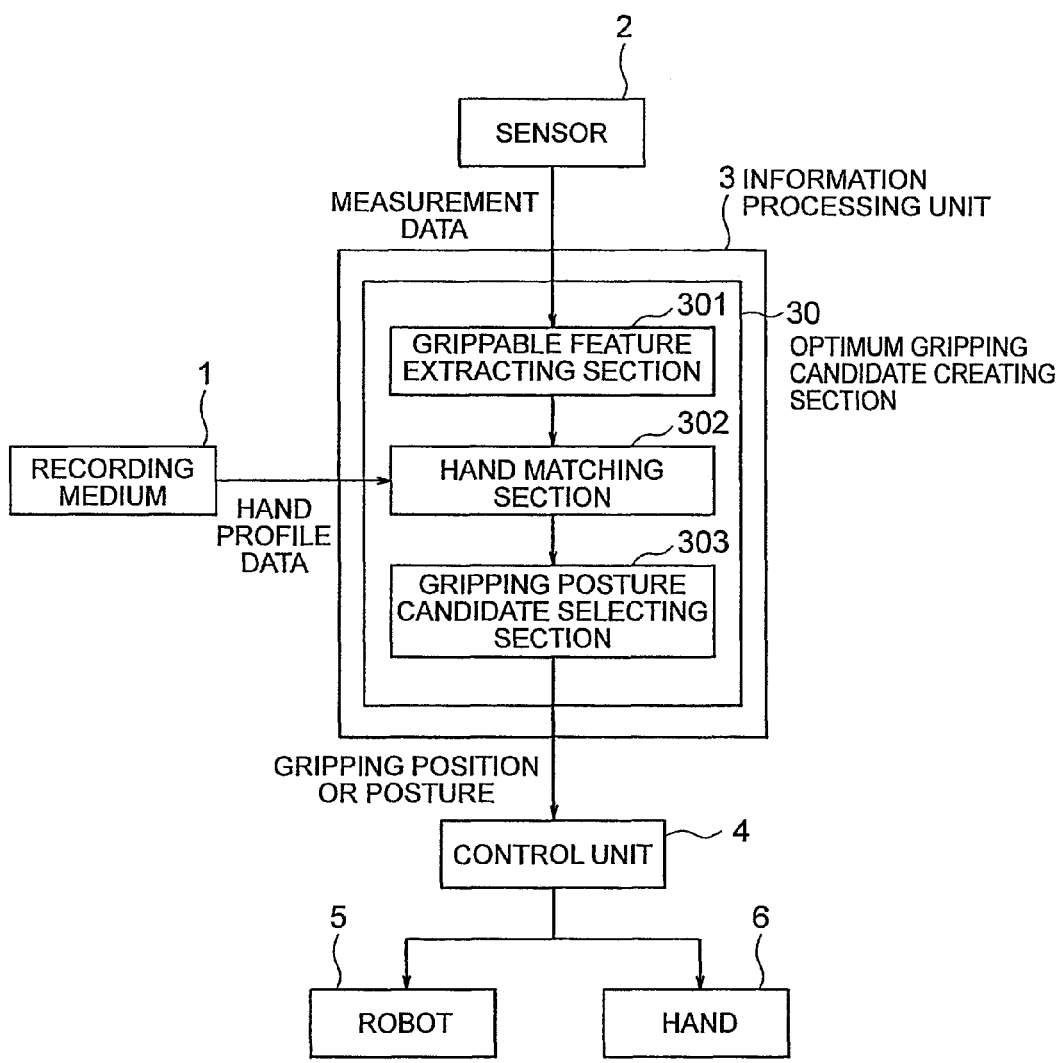
[FIG. 1] An apparatus configuration diagram illustrating a workpiece pick-up apparatus according to a first embodiment of the present invention.

FIG. 1 is an apparatus configuration diagram illustrating a workpiece pick-up apparatus according to a first embodiment of the present invention. The workpiece pick-up apparatus includes at least a storage meduim 1, a sensor 2, an information processing unit 3, a control unit 4, a robot 5, and a hand 6.

The storage meduim 1 accumulates at least hand profile data. The sensor 2 is configured to obtain three-dimensional measurement data of bulked workpieces. The information processing unit 3 outputs a gripping position or posture for a workpiece based on the data from the storage medium 1 and the sensor 2. The control unit 4 is configured to control an operation of the robot 5 and an operation of the hand 6 based on the data on the gripping position or posture obtained by the information processing unit 3. Further, the robot 5 is configured to bring the hand 6 into an arbitrary position or posture based on a command from the control unit 4, and the hand 6 is configured to grip the workpiece.

The sensor 2 may be installed at a tip of the robot 5, or installed at another appropriate fixing position than the robot 5. Further, the sensor 2 may be, for example, a twin- or multi-lens stereo camera, an active stereo camera including a light projecting unit, such as a laser and a projector, and a camera unit, a device using the time-of-flight method, a single-lens device using a robot operation based on the factorization method, the structure-from-motion process, and the structure-and-motion process, a motion stereo camera, and a device using the volume intersection method, as long as the sensor 2 can obtain three-dimensional data in an arbitrary region.

The hand 6 may be a hand of an external gripping type, a suction/attraction type, or a type in which the hand is inserted into a hole and opened (hereinafter referred to as "internal gripping type").

One of the features of the present invention resides in that the gripping position or posture is dynamically determined based on the hand profile and the measurement data instead of determining the gripping position or posture in advance based on the workpiece profile. Specifically, the information processing unit 3 includes an optimum gripping candidate creating section 30 for dynamically determining a gripping position in the field represented by the workpiece measurement data from the sensor 2. Further, the optimum gripping candidate creating section 30 includes a grippable feature extracting section 301, a hand matching section 302, and a gripping posture candidate selecting section 303. The grippable feature extracting section 301 extracts grippable features from the workpiece measurement data of the sensor 2. The hand matching section 302 matches the hand profile data accumulated in the storage meduim 1 with the features extracted by the grippable feature extracting section 301 to dynamically create a plurality of gripping position/posture candidates. The gripping posture candidate selecting section 303 selects, from among the gripping position/posture candidates created by the hand matching section 302, a gripping position or posturewhich enables the easiest gripping. In the following, the respective sections are described in more detail.

The grippable feature extracting section 301 extracts features grippable by the hand 6 in use irrespective of the entire workpiece profile. For example, in a case of the hand 6 of the external gripping type, the features correspond to protrusions or edges which are easy to pinch. In a case of the hand of the suction/attraction type, the features correspond to a surface in a given range or wider. Further, in a case of the hand of the internal gripping type, the features correspond to a circular hole formed in the surface of the workpiece.

Those features can be extracted by fitting an edge, a surface, a circle, and the like to the three-dimensional measurement data. As a method for determining those features at high speed, for example, there are a method of detecting edges in a distance image showing a distance represented by brightness through use of the Canny operator, the Sobel operator, or the like, a method of extracting a circle through the Hough transform, a method of extracting a surface by labeling a region surrounded by edges, and a method of detecting a textured portion as protrusions through use of an edge gradient direction of the brightness and intensity thereof. Those features are determined through basic image processing, and hence the processing is completed at considerably high speed even when a large number of features are extracted.

The hand matching section 302 matches the features extracted by the grippable feature extracting section 301 with the hand profile data (model) accumulated in the storage meduim 1. The matching is implemented by providing models as illustrated in, for example, FIG. 2 in accordance with the types of the hand. For example, in the case of the external gripping type, the matching may be defined by an opening width of the hand arm immediately before gripping approach, a depth of entrance, and a longitudinal width and a lateral width of the hand. Further, in the case of the suction/attraction type, the matching may be defined by a radius of the suction or attraction, and in the case of the internal gripping type, the matching may be defined by a radius of the insertion hole, a radius of a workpiece surface on the periphery of the hole, and the depth of entrance. The hand profile data as described above has simple parameters, and hence the necessary data amount is small. When determining the parameters, the parameters may be calculated based on CAD data of the hand 6, or the hand 6 may be measured directly.

In the matching with the hand profile model as described above, for example, in the case of the suction/attraction type, the candidate is set to a portion having a high degree of matching between the model and the feature point group, but a matching score of the candidate is decreased when the degree of matching with the model is low due to a small surface of the feature or a hole formed in the surface of the feature. Ina case of a 3D model, this processing is implemented by matching between the point groups using the iterative closest point (ICP) method or the like, and in a case of a 2D model, this processing is implemented by template matching or matching using convolution processing with the model regarded as a filter. Further, in the case of the external gripping type and the internal gripping type, interference with the surrounding environment may further be taken into consideration at the same time. Specifically, for example, in the case of the external gripping type, when the measurement data is included in a region defined by the depth of entrance and the longitudinal width and the lateral width of the hand, this processing is implemented by decreasing the matching score. The hand matching section 302 calculates gripping positions or postures each having the highest matching score for the plurality of features extracted by the grippable feature extracting section 301, and sets the plurality of gripping positions or postures as the gripping position/posture candidates. Alternatively, the hand matching section 302 calculates a plurality of gripping positions or postures each having a matching score higher than a predetermined threshold value for a single feature extracted by the grippable feature extracting section 301, and sets the plurality of gripping positions or postures as the gripping position/posture candidates. Through the processing described above, the gripping positions or postures can be defined dynamically even when the workpiece profile is not defined.

Further, in the above-mentioned matching, the grippable feature extracting section 301 calculates a principal normal on the distance image, and hence the score can be calculated through two-dimensional image matching with three degrees of freedom, specifically, two degrees of freedom for translation and one degree of freedom for rotation. Thus, it is possible to calculate the gripping positions or postures which enable easy gripping at high speed without interference between the features.

The gripping posture candidate selecting section 303 selects, from among the gripping position/posture candidates created by the hand matching section 302, a gripping position/posture candidate which enables the easiest gripping. The gripping posture candidate selecting section 303 may select a gripping position/posture candidate having the highest score assigned by the hand matching section 302, and may further assign additional priorities. For example, the gripping posture candidate selecting section 303 may use an average height and gravity center positions of the features extracted by the grippable feature extracting section 301 to select a workpiece located at the highest position in the scene of the bulked workpieces.

When a single optimum gripping position or posture is created by the information processing unit 3 as described above, the control unit 4 controls the operation of the robot 5 and the operation of the hand 6 based on the data on the gripping position candidate, and the hand 6 grips and picks up the targeted workpiece from among the plurality of bulked workpieces.

According to the workpiece pick-up apparatus of this embodiment that is configured as described above, when at least the hand profile data and the hand profile models based on the hand profile data are held as preparatory information, the gripping position or posture, which is less liable to cause the interference between the peripheral workpieces and the hand and enables easy gripping, can be calculated dynamically irrespective of the workpiece profile and the state of the scene of the bulked workpieces. Thus, through use of the same algorithm even when the workpiece profile has changed, the workpiece can be picked up while achieving a small amount of data to be held in advance and a short calculation time. Further, there is no need to perform processing of redefining the priorities of the parts of the workpiece every time the hand profile has changed, and hence it is possible to resolve the problem in that the labor and calculation time are increased along with the change of the priorities.

Second Embodiment.

In the above-mentioned first embodiment, the hand profile data is directly matched with the workpiece measurement data, that is, only the handprofile data is used for calculating the optimum gripping position or posture. In contrast, in a second embodiment of the present invention, the gripping positions or postures are narrowed down, and then workpiece profile data is further used for estimating a state of entanglement between the workpieces and estimating whether or not the pick-up operation is successful. Such estimation cannot be performed when only the measurement data is used.

Figure 3:
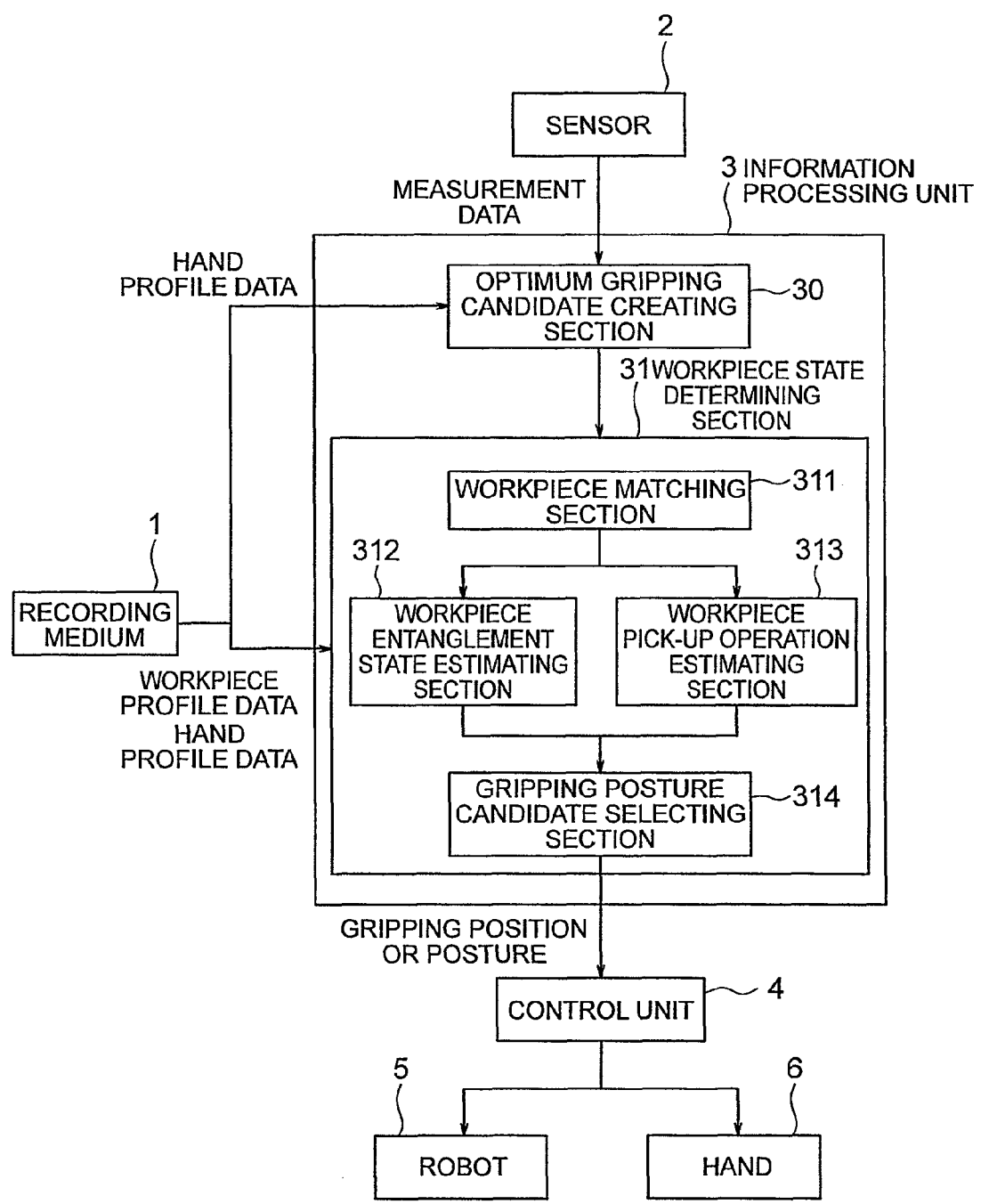
[FIG. 3] An apparatus configuration diagram illustrating a workpiece pick-up apparatus according to a second embodiment of the present invention.

In the second embodiment, the storage medium 1 also accumulates the workpiece profile data in addition to the hand profile data, and as illustrated in FIG. 3, the information processing unit 3 further includes a workpiece state determining section 31 for evaluating, based on the workpiece profile data, the gripping positions or postures calculated by the optimum gripping candidate creating section 30.

As illustrated in FIG. 3, the workpiece state determining section 31 includes a workpiece matching section 311, a workpiece entanglement state estimating section 312, a workpiece pick-up operation estimating section 313, and a gripping posture candidate selecting section 314. The workpiece entanglement state estimating section 312 is configured to implement an operation of determining interference between workpiece models, which are created through matching between the workpiece measurement data and the workpiece profile data, so as to determine entanglement between the bulked workpieces, which is not observed in the workpiece measurement data, and giving preference to gripping positions or postures corresponding to objects with less entanglement. The workpiece pick-up operation estimating section 313 is configured to implement an operation of calculating gravity center positions of the respective workpieces at the time of gripping based on the hand profile data, the workpiece profile data, and the calculated gripping positions or postures, and giving preference, based on the gravity center position, to gripping positions or postures with a lower risk of falling of the workpiece after the gripping or inclination of the workpiece after the gripping.

In the following, operations of the respective sections are described in more detail. First, the optimum gripping candidate creating section 30 of the second embodiment is basically the same as the optimum gripping candidate creating section 30 of the first embodiment, but is different in that the optimum gripping candidate creating section 30 of the second embodiment selects a plurality of gripping positions or postures instead of determining only one gripping position or posture which can be evaluated as being optimum. In this case, scores for assigning priorities may be created for the plurality of selected gripping positions or postures.

The gripping positions or postures newly calculated by the optimum gripping candidate creating section 30 and the extracted features that are used for the calculation are set as initial candidates, and the workpiece matching section 311 matches the initial candidates with the workpiece profile data. The fact that the initial candidates have already been determined corresponds to the completion of initial search performed for the matching with the workpiece models. In this case, when the features are constituted by three-dimensional point groups or edge point groups, accurate matching is performed by the ICP method or the like. In the case of a two-dimensional image, there may be employed template matching with three degrees of freedom, specifically, two degrees of freedom for translation and one degree of freedom for rotation, matching using hashes, silhouette matching, or matching based on a geometric relationship between the features. Further, portions of the workpiece which are likely to be extracted as the features by the optimum gripping candidate creating section 30 may be determined in advance to narrow the search range for matching, which leads to higher speed matching.

The workpiece entanglement state estimating section 312 obtains corresponding workpiece models by matching the workpiece measurement data with the workpiece profile data for a workpiece corresponding to a given gripping position or posture and a workpiece group on the periphery of the workpiece. The workpiece entanglement state estimating section 312 then analyzes the states of those workpiece models to determine the interference between the workpieces. As a result, when parts of the respective workpiece models are located at the same position so that the workpiece models interfere with each other, the workpiece entanglement state estimating section 312 performs, for example, processing of excluding the gripping positions or postures corresponding to those workpiece models from the candidates, or processing of decreasing the priorities of candidate selection in the gripping posture candidate selecting section 314. In this case, even when the workpiece models do not interfere with each other, the workpiece entanglement state estimating section 312 may simulate the pick-up operation for the workpiece models, and when the workpiece models abut against other peripheral workpiece models as a result of the operation, the workpiece entanglement state estimating section 312 may similarly exclude the corresponding gripping positions or postures from the candidates or decrease the priorities thereof.

Figure 2:
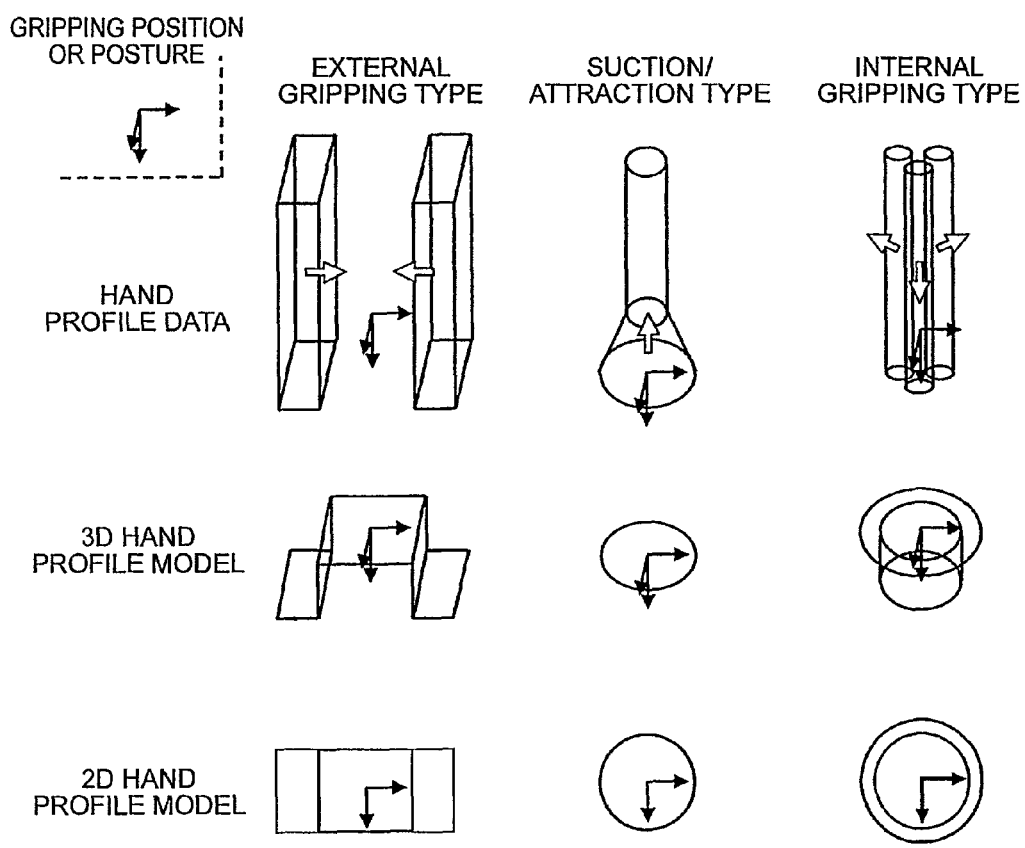
[FIG. 2] A diagram exemplifying hand profile data and hand profile models based on the hand profile data.

The workpiece pick-up operation estimating section 313 simulates the gripping by using a given gripping position or posture and a corresponding workpiece model, and further using a corresponding hand profile model at the gripping position or posture. When the hand grips the workpiece at the gripping position or posture, the workpiece pick-up operation estimating section 313 calculates a specific gravity center position of the workpiece, but excludes or decreases the priority of the gripping position or posture which exhibits a high risk of falling at the time of the pick-up operation. In order to perform this processing, the workpiece pick-up operation estimating section 313 may determine the risk of falling by, for example, setting an evaluation index to an Euclidean distance between the gripping position of the hand prepared as illustrated in FIG. 2 and the calculated gravity center position of the workpiece.

The gripping posture candidate selecting section 314 selects an optimum gripping position or posture based on the priorities evaluated by the workpiece entanglement state estimating section 312 and the workpiece pick-up operation estimating section 313. In this case, the scores assigned to the candidates created by the optimum gripping candidate creating section 30 may be used. The respective evaluation indices may be represented by linear combination such as addition or non-linear combination such as multiplication. Further, there may be employed, for example, a selection method of referring mainly to the scores of the optimum gripping candidate creating section 30 and discarding candidates having the priorities of the workpiece entanglement state estimating section 312 and the workpiece pick-up operation estimating section 313 which exhibit values equal to or smaller than a given value.

According to the workpiece pick-up apparatus of the second embodiment, similarly to the first embodiment, a candidate which is less liable to cause the interference with the hand and enables highly accurate gripping can be selected while reducing the data amount, the labor for registering the models, and the calculation time. In addition, in this embodiment, a gripping position or posture which is less liable to cause the entanglement between the workpieces and enables the workpiece to be picked up with a lower risk of failure of falling during the pick-up operation is preferentially selected, and hence a pick-up operation with a higher success rate can be implemented as well.

Third Embodiment.

Figure 4:
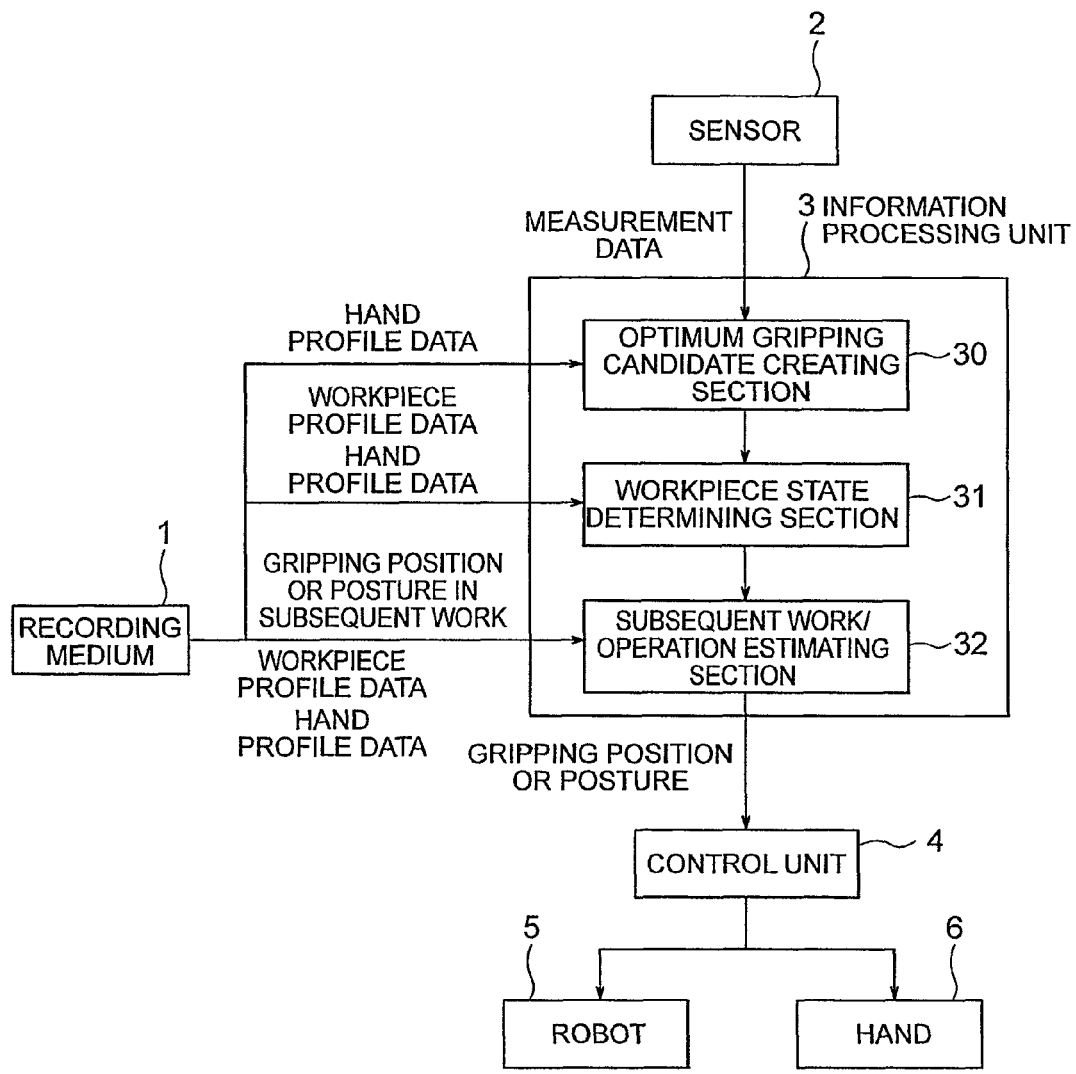
[FIG. 4] An apparatus configuration diagram illustrating a workpiece pick-up apparatus according to a third embodiment of the present invention.

Referring to FIG. 4, a workpiece pick-up apparatus according to a third embodiment of the present invention is described. The third embodiment is configured so that, in the above-mentioned second embodiment, the storage meduim 1 further accumulates data on a gripping position or posture in the subsequent work or operation, and as illustrated in FIG. 4, the information processing unit 3 further includes a subsequent work/operation estimating section for estimating a gripping position candidate suited to the subsequent work.

A subsequent work/operation estimating section 32 estimates the gripping position candidate based on the gripping position or posture in the subsequent work or operation, which is accumulated in the storage meduim 1. In this estimation, when the work subsequent to the work of picking up the workpiece is, for example, assembly of the workpiece to a product under the assembling process, the gripping position or posture for the workpiece that is required during the assembly is limited to a gripping position or posture suited to the assembling operation. For example, the workpiece which is gripped in a reversed posture cannot directly be assembled in many cases, and further, it is difficult to largely change the posture of the robot which is taken during the gripping. A minor gripping error is allowable, but when the gripping is performed with a major error or in a posture of the workpiece different from the assembling posture, the workpiece gripping posture needs to be changed, resulting in an increase in working time and labor. Therefore, in this embodiment, when it is determined that the workpiece gripping posture needs to be changed for the subsequent work from the workpiece gripping posture during the pick-up operation, the subsequent work/operation estimating section 32 decreases the priority of the gripping position/posture as a candidate or discards the gripping position/posture as a candidate. Note that, the subsequent work herein refers to, for example, transportation, palletization, and packaging as well as the assembly.

As a method of determining whether or not the workpiece gripping posture needs to be changed from the gripping position or posture during the pick-up operation, the subsequent work/operation estimating section 32 simulates a gripping state of the workpiece through use of the workpiece profile model, the hand profile model, and the gripping position or posture. As a specific example, the subsequent work/operation estimating section 32 matches the workpiece profile model in a state of being gripped by the hand profile model with the workpiece profile model in a state of being gripped by the hand profile model at the workpiece position which is obtained by simulating the subsequent work such as the assembly. When the robot can compute a transformation matrix between the positions or postures of the respective hand profiles under a state in which the positions or postures of the respective workpiece profile models are matched with each other, the subsequent work/operation estimating section 32 determines that the operation in the subsequent work can be performed without changing the workpiece gripping posture, and when the robot cannot compute the transformation matrix, the subsequent work/operation estimating section 32 determines that it is necessary to additionally perform a work of changing the workpiece gripping posture by, for example, gripping the workpiece again in a different posture or transferring the workpiece to another robotic hand.

According to the workpiece pick-up apparatus of this embodiment that is configured as described above, similarly to the above-mentioned embodiments, the workpiece can be picked up while achieving a small amount of data to be held in advance and a short calculation time. In addition, the tact time can be reduced by eliminating the work of changing the workpiece gripping posture.

Fourth Embodiment.

Figure 5:
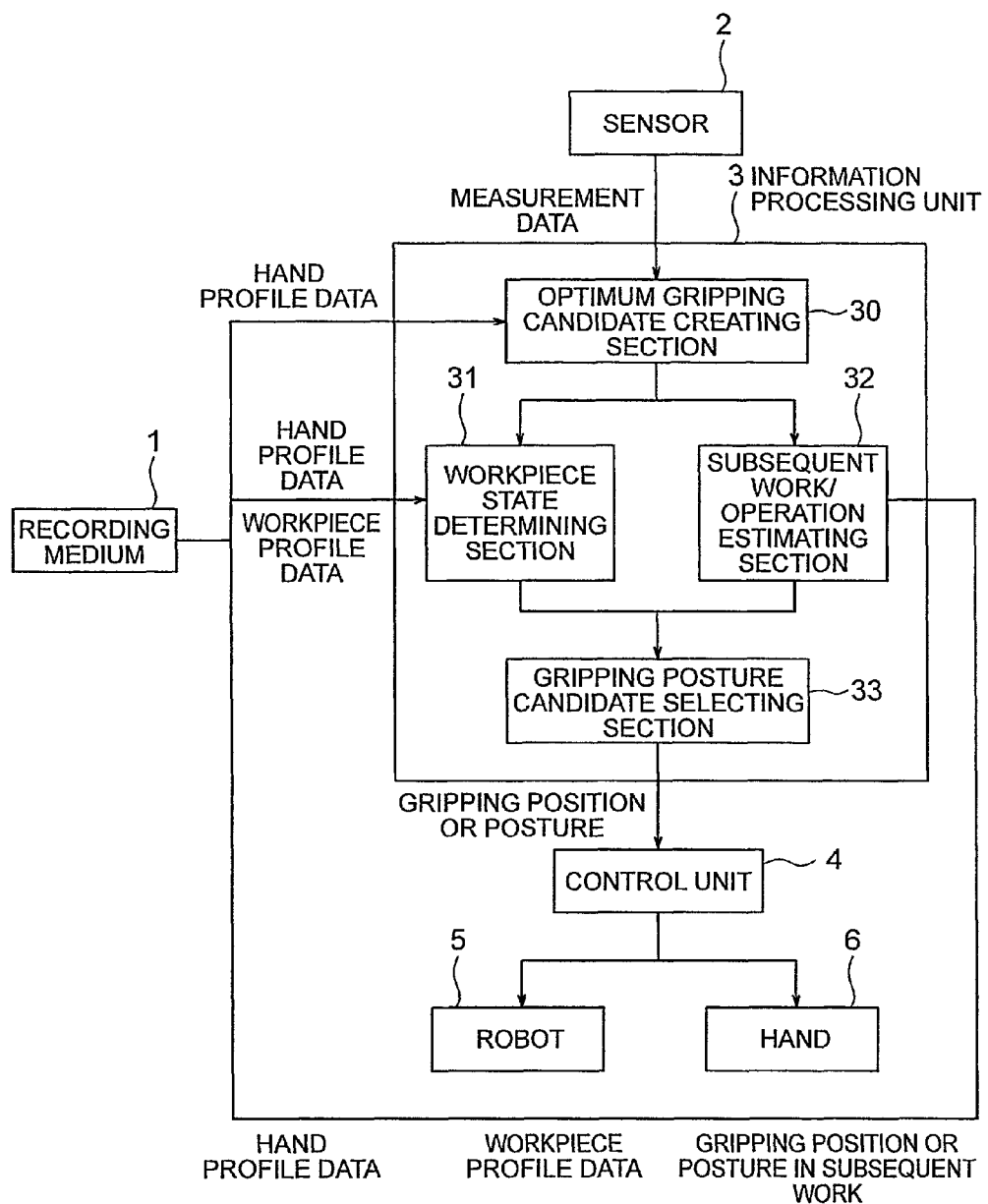
[FIG. 5] An apparatus configuration diagram illustrating a workpiece pick-up apparatus according to a fourth embodiment of the present invention.

The third embodiment illustrated in FIG. 4 employs the processing of screening, by the workpiece state determining section 31, the plurality of gripping position/posture candidates which are calculated by the optimum gripping candidate creating section 30, and then further screening the resultant gripping position/posture candidates by the subsequent work/operation estimating section 32. In contrast, a fourth embodiment of the present invention employs, as illustrated in FIG. 5, processing of evaluating, by the workpiece state determining section 31 and the subsequent work/operation estimating section 32 in a parallel manner, the plurality of gripping position/posture candidates which are calculated by the optimum gripping candidate creating section 30, and finally, comprehensively determining the evaluations by a gripping posture candidate selecting section 33.

In this case, the evaluation may be performed in such a manner that the scores of the candidates calculated by the optimum gripping candidate creating section 30 and the evaluation values of the workpiece state determining section 31 and the subsequent work/operation estimating section 32 are represented by linear combination such as addition or non-linear combination such as multiplication. Further, there may additionally be employed, for example, such processing as to interpose a selection method of referring mainly to the scores of the optimum gripping candidate creating section 30 and discarding candidates having the evaluation values of the workpiece state determining section 31 and the subsequent work/operation estimating section 32 which exhibit values equal to or smaller than a given value.

According to this configuration, similarly to the third embodiment, the tact time can be reduced by implementing an accurate pick-up work and eliminating the work of changing the workpiece gripping posture. In addition, flexible design can be performed for the usage of the evaluation values in accordance with, for example, a part of an actual production system which is liable to cause trouble.

Fifth Embodiment.

Figure 6:
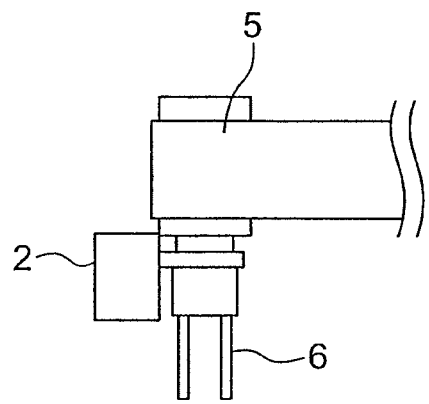
[FIG. 6] Adiagram illustrating apart of a workpiece pick-up apparatus according to a fifth embodiment of the present invention.
Figure 6:

Description is given of an embodiment for implementing a versatile operation of picking up a workpiece from among bulked workpieces, which achieves high speed processing and facilitates adjustment irrespective of the workpiece profile. FIG. 6 illustrates a part of a workpiece pick-up apparatus according to a fifth embodiment of the present invention. The hand 6 of an external gripping type and the sensor 2 for three-dimensional measurement are installed at the tip of the robot 5. The robot 5 of FIG. 6 is an articulated robot with six degrees of freedom, but may instead be an articulated robot with seven degrees of freedom. Alternatively, the robot 5 may be a dual arm robot, a vertical scalar robot, or a parallel-link robot. Further, the sensor 2 is installed at the tip end of the robot 5 so as to be operable together, but alternatively, the sensor 2 may be fixed and installed separately from the robot 5, or installed on a different movable stage.

Figure 7A:
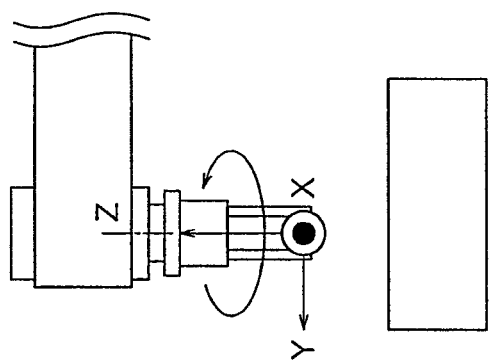
[FIG. 7] Diagrams illustrating restriction on operations of a robot and a hand in picking up a workpiece from among bulked workpieces.
Figure 7B:
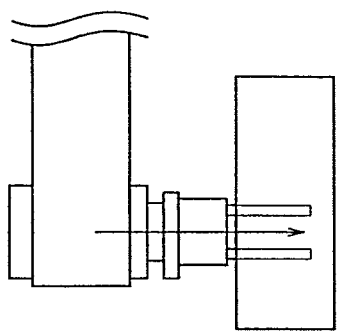
Figure 7C:
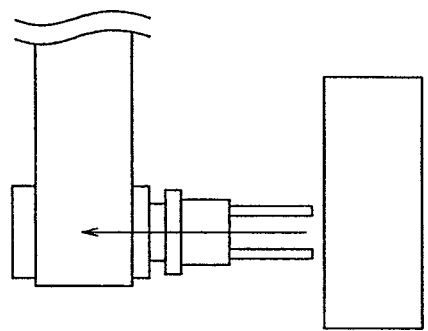

Operations of the robot and the hand in picking up a workpiece from among bulked workpieces are restricted as illustrated in FIG. 7. It is assumed that, at a tip end position of the hand 6, the robot 5 has a coordinate system with X-, Y-, and Z-directions as illustrated in FIG. 7. In this case, as illustrated in FIG. 7(a), the position or posture of the hand 6 is adjusted above a feed box 7 so that one of the bulked objects in the feed box 7 can be gripped through an operation with two degrees of freedom for translation along the X-axis and the Y-axis and one degree of freedom for rotation about the Z-axis. Then, as illustrated in FIG. 7(b), the hand 6 enters the feed box 7 through a motion with one degree of freedom for translation in the Z-direction to grip the workpiece. Further, as illustrated in FIG. 7(c), the hand 6 is raised through an operation with one degree of freedom for translation in the Z-direction while gripping the workpiece. Those operations are implemented by operations with a total of four degrees of freedom, specifically, three degrees of freedom for translation and one degree of freedom for rotation.

There are many advantages from the above-mentioned operations. For example, in a case where the motion with six degrees of freedom falls out of the operating range of the robot 5, when the robot 5 is controlled to perform the motion with six degrees of freedom in accordance with the posture of the workpiece, the robot 5 stops due to an error. However, when the pick-up operation can be implemented by the above-mentioned operations with a total of four degrees of freedom, such a situation can be avoided with high possibility. In addition, it is possible to avoid a risk in that the robot 5 or the hand 6 collides against the feed box 7, the sensor 2, or the like due to the complex motion with six degrees of freedom. It is easy to design the robot operating range, the safety range, and the interference avoidance range by the motion with four degrees of freedom. Further, when the operation is performed with a total of four degrees of freedom, a vertical scalar robot which is cost efficient and operates at high speed may be employed as the robot 5.

Figure 8:
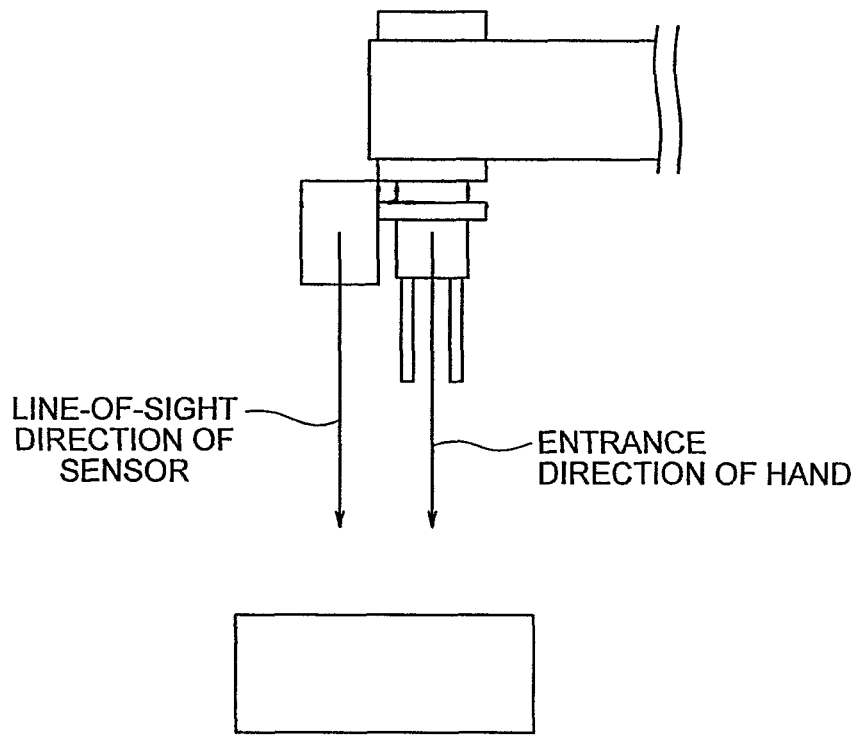
[FIG. 8] A diagram illustrating a relationship between a line-of-sight direction of a sensor and a direction of an entrance operation.

When the entrance operation of approaching the workpiece is restricted as the operation with one degree of freedom for translation, as illustrated in FIG. 8, a line-of-sight direction of the sensor 2 is aligned with the direction of the entrance operation. The line-of-sight direction of the sensor herein refers to an optical axis direction of a camera lens. In this case, the gripping position or posture can be calculated at high speed through only the image processing based on the distance image taken by the sensor 2 and the two-dimensional model of the hand profile illustrated in FIG. 2 (hereinafter referred to as "two-dimensional hand model").

Figure 9:
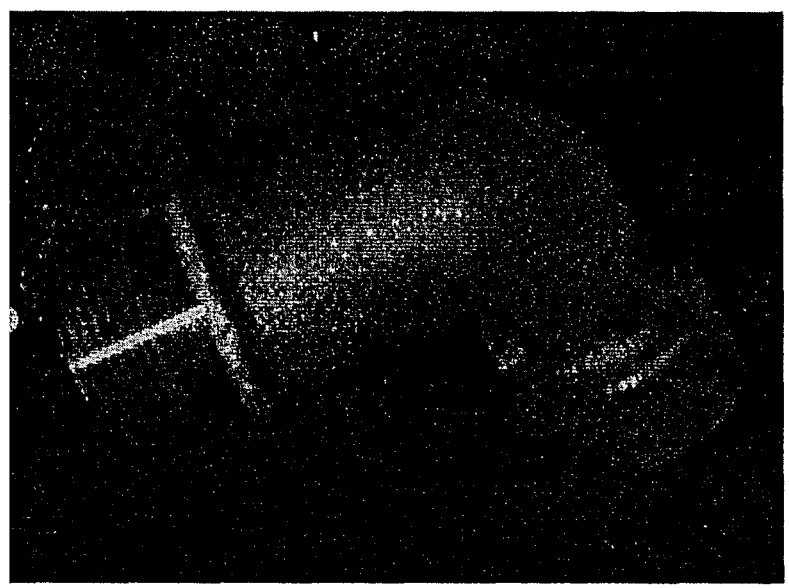
[FIG. 9] A diagram illustrating an example of a distance image.
Figure 9:
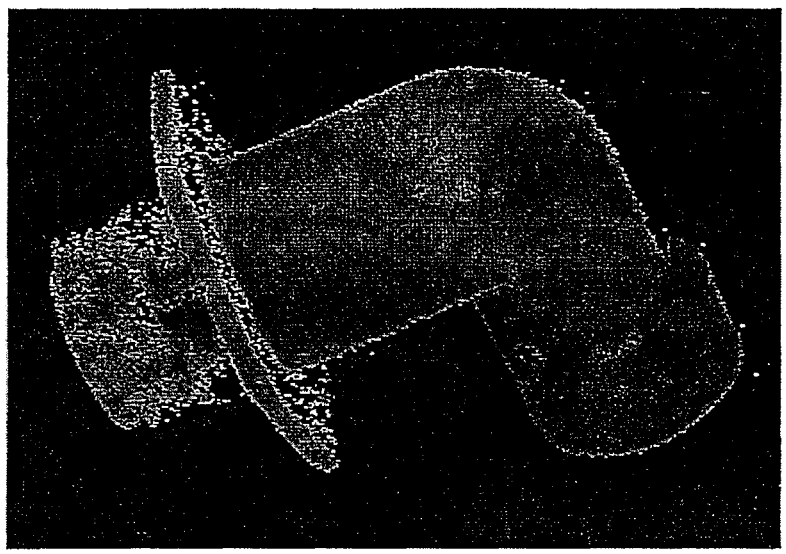
Figure 10:
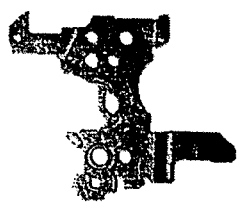
[FIG. 10] A diagram illustrating a camera image and a distance image obtained through measurement of a bulked state of workpieces with a three-dimensional sensor.
Figure 10:
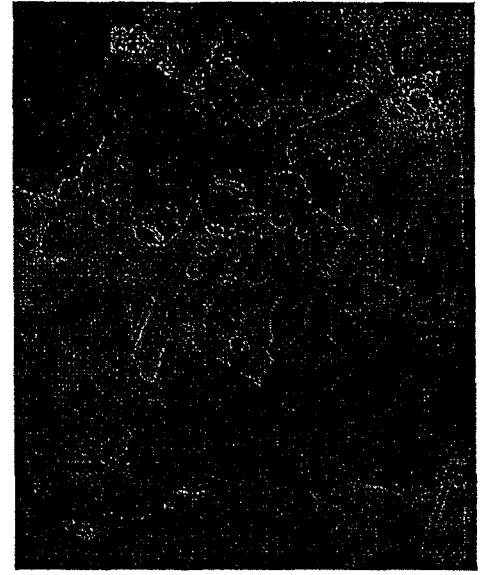
Figure 10:

FIG. 9 illustrates an example of the distance image. In a case of an image taken by a camera, each pixel holds a light reflection amount on the surface of the object as a brightness value. On the other hand, in the case of the distance image, each pixel holds a height of a corresponding portion of the object. The distance image of FIG. 9 shows that a portion closer to the sensor 2 that has taken the image is brighter, and a portion spaced apart from the sensor 2 is darker. In the distance image, three-dimensional information containing a height can be handled as an image, and hence there is an advantage in that the computation amount is smaller as compared to the case where the information is handled as three-dimensional position data. In addition, in the case of the distance image, many image processing methods that have conventionally been used in the production field are applicable. The distance image may be obtained by a three-dimensional measurement method capable of obtaining height information, such as a Coded Structured Light (spatial coded method) and a stereographic method, and a three-dimensional sensor for implementing the three-dimensional measurement method. FIG. 10 illustrates a camera image and a distance image obtained through measurement of a bulked state of given workpieces with the three-dimensional sensor.

Description is given of a method of creating an optimum gripping candidate to be used for picking up a workpiece in the above-mentioned configuration in which the operation of the robot 5 is restricted as the operation with four degrees of freedom, the line-of-sight direction of the sensor 2 is aligned with the direction of the entrance operation, and the distance image of bulked workpieces is used. Note that, the following description is directed exclusively to the case of picking up and gripping the workpiece irrespective of the gripping posture for the workpiece. CAD data, point group data, distance data, two-dimensional image data, and partial information (area of the workpiece at a specific portion, length of the edges, feature of the texture, geometric relationship between characteristic portions of the workpiece, such as a hole) of the workpiece are not prepared in advance. This is for the purpose of reducing the labor required for the preadjustment in accordance with the workpiece profile, and for avoiding the increase in data amount along with the increase in number of workpieces to be handled.

Figure 11:
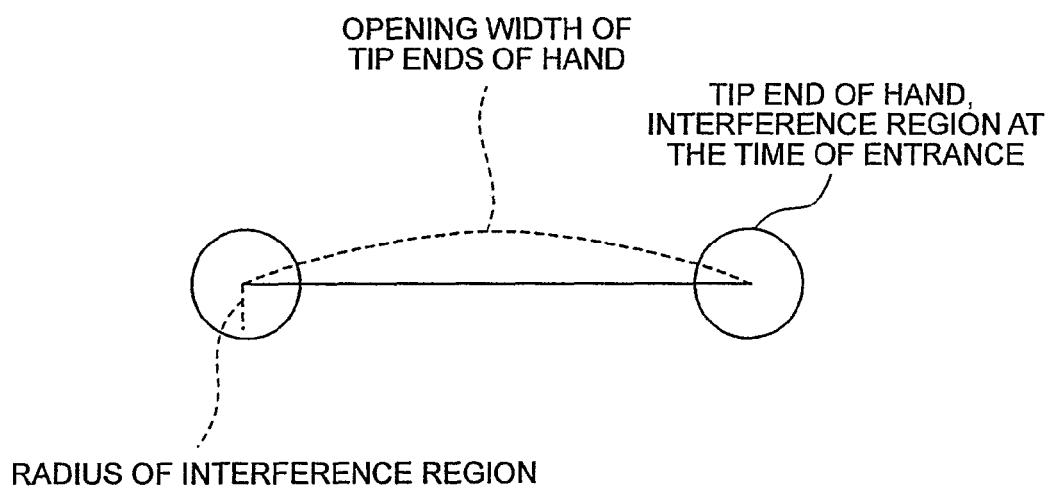
[FIG. 11] A diagram exemplifying a two-dimensional hand model to be used in the fifth embodiment.

A two-dimensional hand model as illustrated in FIG. 11 is used for calculating the gripping position for the workpiece based on the distance image. This two-dimensional hand model is obtained by further simplifying the 2D hand profile model of the external gripping type illustrated in FIG. 2, and the distal end portions of the hand, which abut against the workpiece at the instant when the hand 6 performs the entrance and gripping operations, are represented by circular interference regions. There are two interference regions corresponding to the tip ends of the hand for gripping the workpiece, and hence the two-dimensional hand model can be defined by only a total of two parameters, specifically, the radius of each circle and the opening width of the hand, which determines the positional relationship between the two circles. When each of the tip ends of the hand is a rectangular solid, the two-dimensional hand model may be represented by using three parameters, specifically, the length and width of the rectangular solid instead of the radius of the circle. Alternatively, the two-dimensional hand model may be defined by parameters indicating a polygon or an ellipse. However, the two-dimensional hand model does not need to be defined as strictly as in the case described above. The hand functions correctly even when approximate circles are used in the model for avoiding the interference as long as the radius of each approximate circle is set sufficiently large so as to cover the entire interference region.

Figure 12:
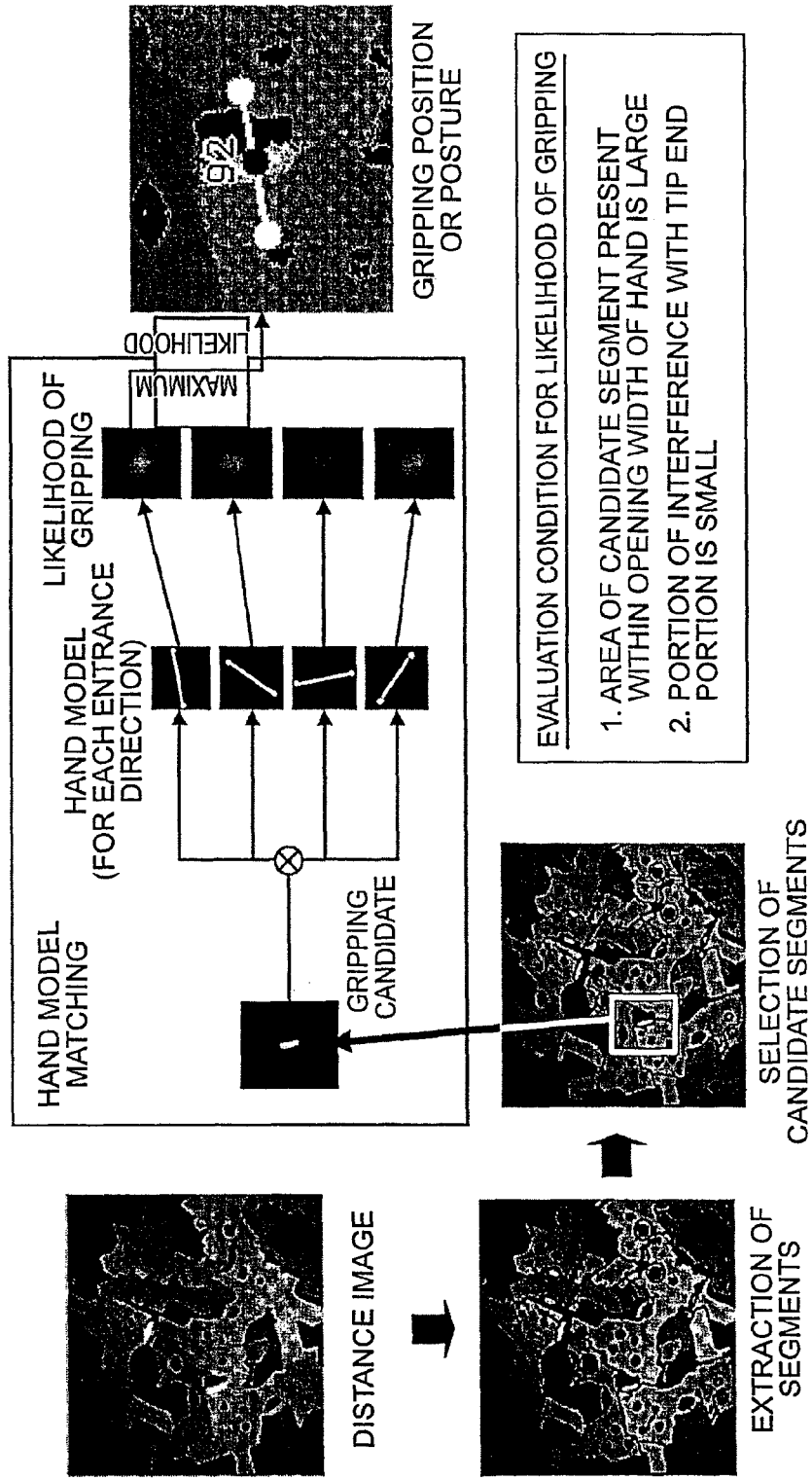
[FIG. 12] A conceptual diagram illustrating processing of creating an optimum gripping candidate through use of the distance image and the two-dimensional hand model.
Figure 13:
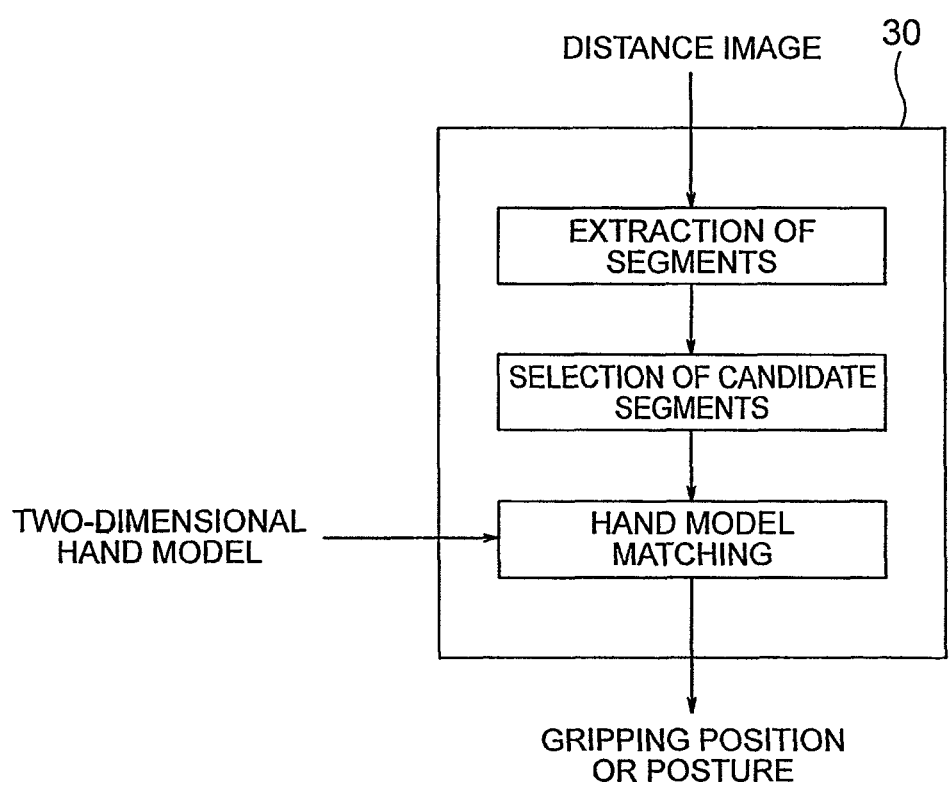
[FIG. 13] A flow chart illustrating the processing of FIG. 12.

FIG. 12 conceptually illustrates processing of creating an optimum gripping candidate through use of the distance image and the two-dimensional hand model. FIG. 13 illustrates a processing flow thereof. In this processing, segments are first extracted from the distance image. The segment herein refers to a flat or curved surface portion of the workpiece surrounded by profile edges. The segmentation refers to the extraction of segments. The extraction is implemented by edge detection in the distance image using the Canny operator or the Sobel operator. The edge in the distance image refers to the profile edge of the object itself. The region segmented by the detected edges corresponds to the flat or curved surface portion of the workpiece. By this method, the segments may be extracted also for thin screws, springs, and the like, which are hard to perform model matching with the workpiece profile.

Subsequently, the large number of extracted segments are narrowed down to several candidates. This narrowing contributes to the reduction in calculation time, but the processing itself may be implemented even when all the segments are selected as candidates, and hence the present invention may be carried out without narrowing the segments. As a method of selecting candidates, for example, a plurality of segments may be selected in a descending order of priority from a segment located at the highest position, or the candidates may be selected based on the areas of the segments instead of the height information. From among those candidates, there is output a gripping position or posture having the highest score (likelihood of gripping) resulting from matching as described below.

The segments selected as the candidates are each matched with the two-dimensional hand model. In this manner, search is performed for a position which enables stable gripping without collision. This processing is implemented by searching for a gripping position or posture in a region which 1) ensures a large area of the segment present within the opening width of the hand, and 2) prevents the interference and collision between the interference regions at the tip ends of the hand and the periphery of the segment. The region 1) can be calculated through convolution processing of the candidate segment and the portion of the opening width of the hand, and the region 2) can be calculated through convolution processing of the candidate segment including its periphery, which may cause collision, and the interference regions at the tip ends of the hand. When the region 2) is subtracted from the region 1), a "region which may enable gripping and has no risk of collision" can be obtained. The resultant region is smoothed and then visualized as a likelihood of gripping illustrated in FIG. 12. That is, the gripping position or posture to be calculated is a position or posture of the hand model at the time when the maximum likelihood is recorded. This position or posture is calculated for the only one segment selected as the candidate or the plurality of segments selected as the candidates. In the case of the only one segment, there is selected a position or posture of the hand model which records the maximum likelihood in the segment. In the case of the plurality of segments, there is selected a position or posture of the hand model which records the highest value of the maximum likelihood in the segment among the maximum likelihoods in the respective segments. The resultant image of the gripping position or posture illustrated in FIG. 12 shows that the calculation result thus output indicates appropriateness of gripping which is performed substantially perpendicular to the edge at the gravity center position of a partially projecting portion of the workpiece. The value "92" is obtained by normalizing the likelihood of gripping with respect to the area, and indicates the "easiness of gripping of the workpiece" on a scale of "100". The dark gray circle in the middle represents the gripping position, and the two white circles connected through the straight line represent the interference regions at the tip ends of the hand.

Figure 14:
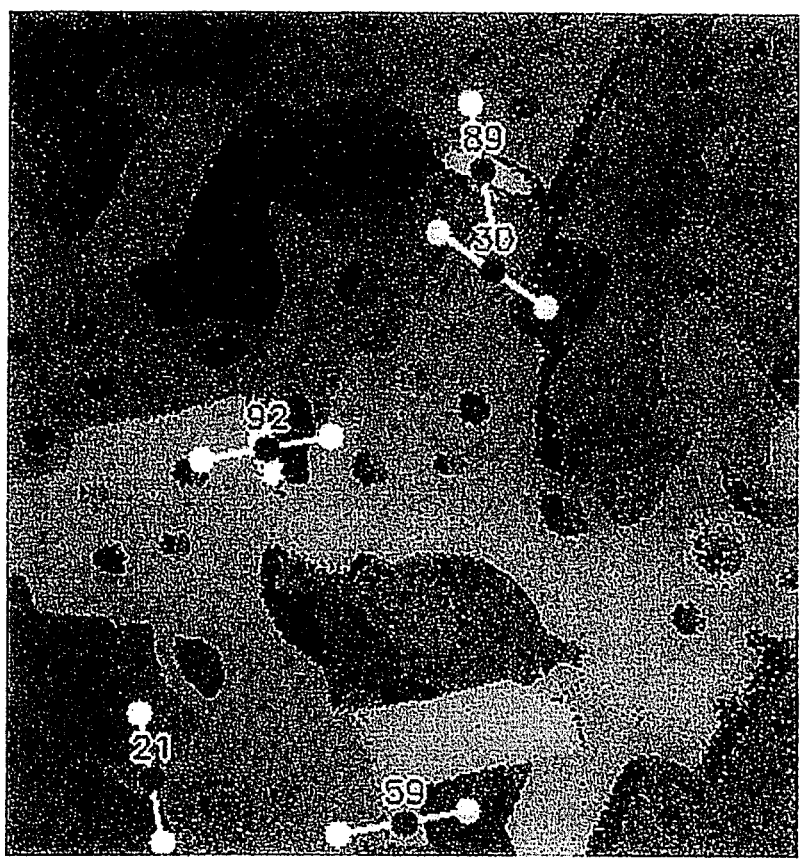
[FIG. 14] A diagram illustrating a clearer resultant image of a gripping position or posture in FIG. 12.

FIG. 14 illustrates a clearer result obtained by calculating the gripping positions or postures for several candidate segments in the same manner. Referring to FIG. 14, a portion having no interference on the periphery scores high, and a portion having the risk of collision at the time of entrance scores low. In addition, it is found that a portion orthogonal to the edge at the gripping position scores high.

Figure 15:
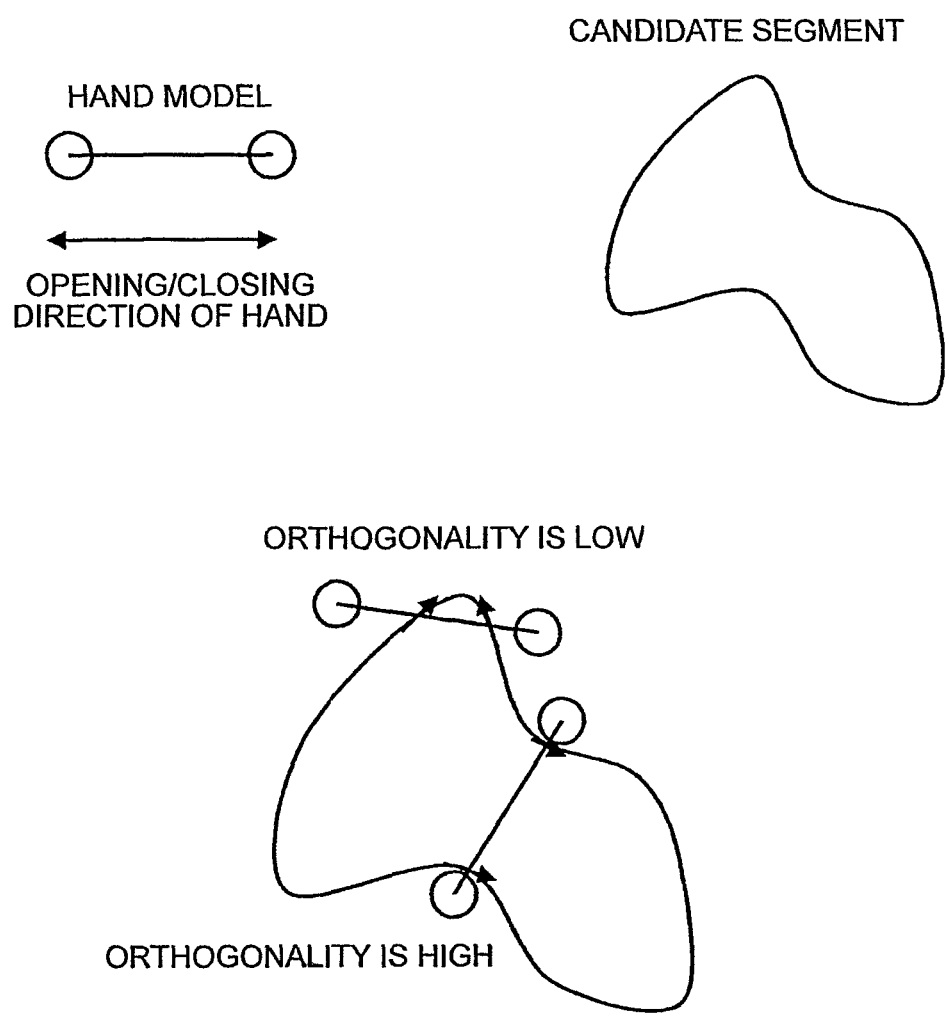
[FIG. 15] An explanatory diagram illustrating a state in which an opening/closing direction of the hand at a gripping position is perpendicular to directions of profile edges of a candidate segment so that a gripping state is more stable.

Further, in order to stabilize the gripping state, it is preferred that the opening/closing direction of the hand at the gripping position be perpendicular to the direction of the profile edge of the candidate segment. FIG. 15 illustrates an example thereof. Edges of the candidate segment are detected, and edge directions in the respective local regions are calculated. When the two-dimensional hand model oriented in a given opening/closing direction of the hand is present at a given gripping position which overlaps with the candidate segment, the orthogonality is evaluated higher as the edge direction of the profile edge of the candidate segment, which intersects with the two-dimensional hand model, and the opening/closing direction of the hand are closer to the perpendicular state, to thereby search for a more stable gripping posture. Through multiplication of the above-mentioned score of the likelihood of gripping by the evaluation result for the orthogonality or addition of the evaluation result thereto with a weight, both the evaluations can be reflected.

Figure 16:
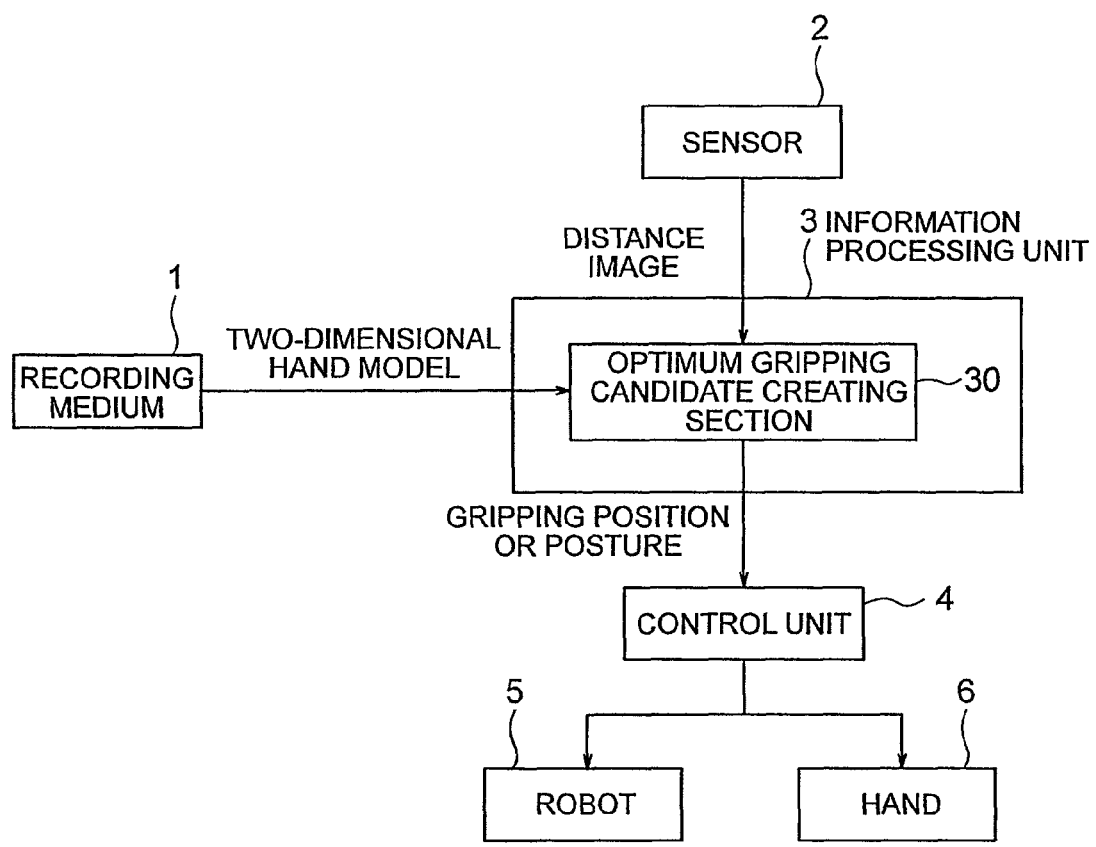
[FIG. 16] An apparatus configuration diagram illustrating the workpiece pick-up apparatus according to the fifth embodiment.

FIG. 16 is an apparatus configuration diagram illustrating the workpiece pick-up apparatus according to the fifth embodiment of the present invention. The apparatus includes the storage meduim 1 for accumulating only the two-dimensional hand model, the sensor 2 for generating the distance image of bulked workpieces, the information processing unit 3 which includes the optimum gripping candidate creating section 30 for calculating the gripping position or posture based on the two-dimensional hand model from the storage medium 1 and the distance image from the sensor 2, the control unit 4 for controlling the operations based on the information on the gripping position or posture, the robot 5 for bringing the hand into an arbitrary position or posture based on a command from the control unit, and the hand 6 for gripping a workpiece.

Figure 17:
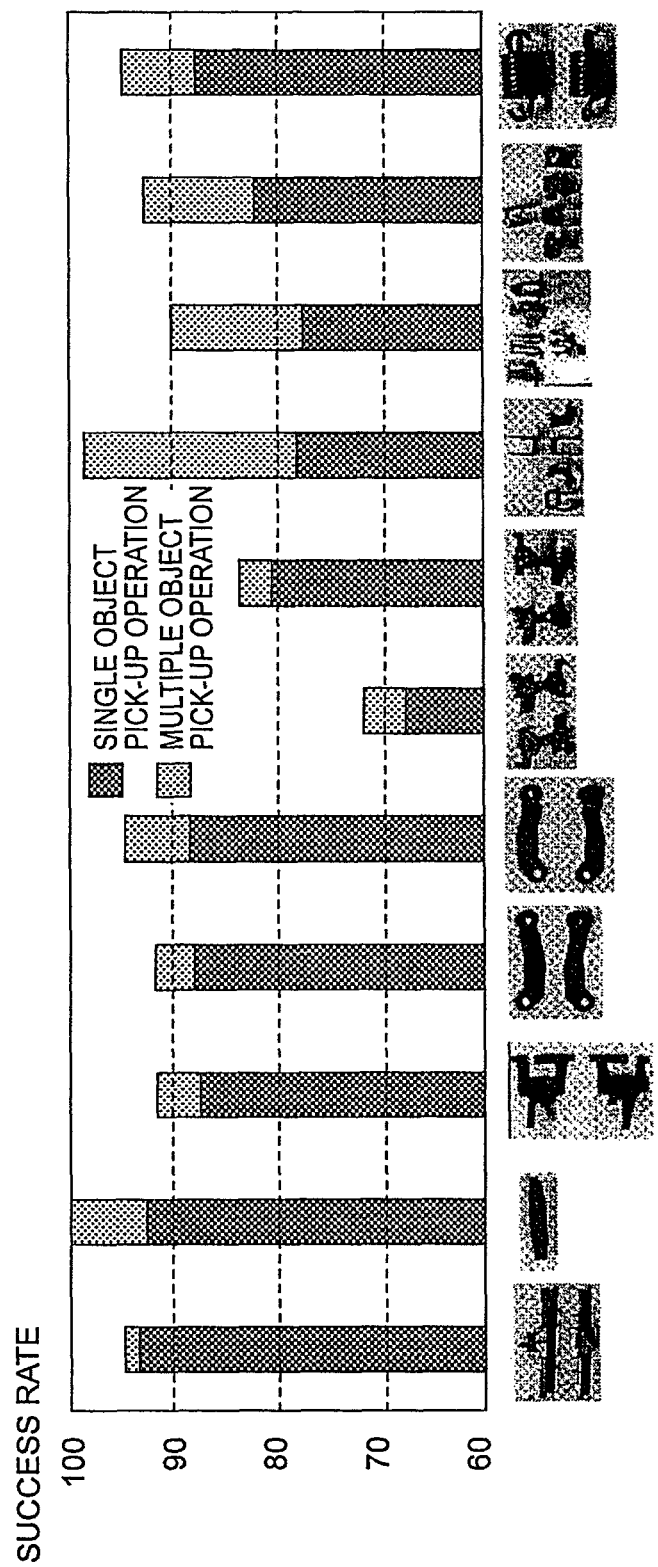
[FIG. 17] A graph showing results of evaluating a success rate by a method according to the fifth embodiment when picking up workpieces for which a gripping test has not been conducted due to difficulty in recognizing the respective workpieces by a conventional method based on a workpiece profile.

The above-mentioned flow of FIG. 12 is a flow of processing to be performed by the optimum gripping candidate creating section 30. This processing is implemented by a PC including a 2G Core 2 Duo and a 2G memory within a calculation time of about 0.1 sec to 0.2 sec, and it is therefore found that the processing is performed at considerably high speed as the processing which handles three-dimensional information. FIG. 17 shows results of evaluating a success rate by a method according to the fifth embodiment of the present invention when picking up workpieces for which a gripping test has not been conducted due to difficulty in recognizing the respective workpieces by the conventional method based on the workpiece profile. The "single object pick-up operation" refers to a case of picking up only one workpiece, and the "multiple object pick-up operation" refers to a case of picking up a plurality of workpieces at the same time. For the multiple object pick-up operation, in the subsequent process, there may be taken, for example, an action of discarding some workpieces based on the measurement result from the camera or determination on the weight, or separating the workpieces under a state in which the workpieces are placed on a flat surface. Therefore, assuming that the failure corresponds only to a case where the workpieces are not picked up, an average success rate of all the workpieces is 91.5%. In this embodiment, a workpiece in a complex profile, which has been hard to pick up from the bulked workpieces, can be picked up at high speed without performing the adjustment for each workpiece.

According to the fifth embodiment that is configured as described above, similarly to the above-mentioned embodiments, the workpiece can be picked up while achieving a small amount of data to be held in advance and a short calculation time. In addition, the following advantages are obtained as well. First, the line-of-sight direction of the sensor is aligned with the entrance direction at the time when the hand approaches the workpiece to pick up the workpiece from among the bulked workpieces. Accordingly, the optimum gripping candidate can be created at highspeed. Further, the robot is brought into a desired gripping position or posture through the restricted operation with a total of four degrees of freedom, specifically, three degrees of freedom for translation in the X-, Y-, and Z-directions and one degree of freedom for rotation about the axis in the entrance direction for picking up a workpiece. Accordingly, the robot operating range, the safety range, and the interference avoidance range can be designed easily, and further, the apparatus is activated more quickly.

Further, the optimum gripping candidate creating section uses the two-dimensional hand model as the hand profile data and the distance image as the workpiece measurement data, to thereby calculate the gripping position or posture based on the likelihood of gripping, which is determined through convolution of the hand profile data and the workpiece measurement data. Still further, the optimum gripping candidate creating section extracts a flat surface or a curved surface based on edge detection in the distance image, and matches the flat surface or the curved surface with the hand profile data, to thereby calculate the grippingposition or posture. Accordingly, the workpiece can be picked up at high speed, and there is no need to perform the adjustment depending on the workpiece profile, which also contributes to quicker activation of the apparatus. Yet further, the optimum gripping candidate creating section calculates the gripping position or posture based on the orthogonality between the opening/closing direction of the hand and the direction of the profile edge of the flat surface or the curved surface, which is extracted based on the edge detection in the distance image. Accordingly, the success rate of the pick-up operation for the workpiece can be increased.

Although the above has specifically described the content of the present invention with reference to the preferred embodiments, it is self-evident that persons skilled in the art can adopt various kinds of modifications based on the basic technical concepts and teachings of the present invention.

Reference Signs List

1 storage meduim, 2 sensor, 3 information processing unit, 4 control unit, 5 robot, 6 hand, 7 feed box, 30 optimum gripping candidate creating section, 31 workpiece state determining section, 32 subsequent work/operation estimating section, 301 grippable feature extracting section, 302 hand matching section, 303 gripping posture candidate selecting section, 311 workpiece matching section, 312 workpiece entanglement state estimating section, 313 workpiece pick-up operation estimating section, 314 gripping posture candidate selecting section.

The invention claimed is:

1. A workpiece pick-up apparatus, comprising:
   a hand for gripping a single workpiece from an object containing a plurality of bulked workpieces in a random manner;
   a robot for bringing the hand into a gripping position or posture that is desired;
   a sensor for performing three-dimensional measurement of the workpiece to obtain workpiece measurement data;
   a storage medium for accumulating at least hand profile data;
   an information processing unit for calculating the gripping position or posture based on data from the sensor and data from the storage medium; and
   a control unit for controlling the robot to grip the workpiece based on the gripping position or posture calculated by the information processing unit,
   wherein the information processing unit includes an optimum gripping candidate creating section for directly deriving the gripping position or posture based on the workpiece measurement data and the hand profile data,
   wherein a line-of-sight direction of the sensor is aligned with an entrance direction at a time when the hand approaches the workpiece to pick up the single workpiece from the object containing the plurality of bulked workpieces, and
   wherein the optimum gripping candidate creating section uses a two-dimensional hand model as the hand profile data and uses a distance image as the workpiece measurement data, to thereby calculate a gripping position or posture at which a segment of the workpiece extracted in the distance image is present within an opening width of the hand and the hand avoids interfering with a segment on a periphery of the workpiece.

2. A workpiece pick-up apparatus according to claim 1, wherein the robot is brought into the gripping position or posture that is desired through a restricted operation with a total of four degrees of freedom, the four degrees of freedom comprising:
three degrees of freedom for translation in an X-direction, a Y-direction, and a Z-direction; and
one degree of freedom for rotation about an axis in the entrance direction for picking up the workpiece.

3. A workpiece pick-up apparatus according to claim 2, wherein the optimum gripping candidate creating section subtracts a region, which is obtained through convolution of a periphery of a candidate segment of the workpiece extracted in the distance image and an interference region at a tip end of the hand, from a region, which is obtained through convolution of the candidate segment and a portion of the opening width of the hand, to thereby calculate the gripping position or posture based on data obtained by smoothing.

4. A workpiece pick-up apparatus according to claim 2, wherein the optimum gripping candidate creating section outputs with priority a gripping position or posture which exhibits a high orthogonality between an edge direction of the segment and an opening/closing direction of the hand.

5. A workpiece pick-up apparatus according to claim 1, wherein the storage medium further accumulates workpiece profile data, and
wherein the information processing unit further comprises a workpiece state determining section for evaluating, based on the workpiece profile data, the gripping position or posture calculated by the optimum gripping candidate creating section.

6. A workpiece pick-up apparatus according to claim 5, wherein the workpiece state determining section comprises a workpiece entanglement state estimating section for determining interference between workpiece models, which are created through matching between the workpiece measurement data and the workpiece profile data, so as to determine entanglement between bulked workpieces, which is not observed in the workpiece measurement data, and giving preference to a gripping position or posture corresponding to an object with less entanglement.

7. A workpiece pick-up apparatus according to claim 5, wherein the workpiece state determining section further comprises a workpiece pick-up operation estimating section for calculating a gravity center position of the workpiece based on the workpiece profile data, and outputs with priority a gripping position or posture which is closer to the gravity center position of the workpiece.

* * * * *